United States Patent [19]

Wang et al.

[11] Patent Number: 5,237,079
[45] Date of Patent: Aug. 17, 1993

[54] COLLECTORS AND PROCESSES FOR MAKING AND USING SAME

[75] Inventors: Samuel S. Wang, Cheshire; D. R. Nagaraj, Stamford, both of Conn.

[73] Assignee: American Cyanamid Company, Stamford, Conn.

[21] Appl. No.: 478,307

[22] Filed: Feb. 12, 1990

Related U.S. Application Data

[62] Division of Ser. No. 375,443, Jul. 5, 1989, Pat. No. 4,929,343, which is a division of Ser. No. 108,611, Oct. 15, 1987, Pat. No. 4,871,466.

[51] Int. Cl.$^5$ ............................................. C07C 119/00
[52] U.S. Cl. ..................................... 554/103; 562/621
[58] Field of Search ....................... 260/404; 562/621; 554/103

[56] References Cited

U.S. PATENT DOCUMENTS 3,936,494  2/1976  Lipowski ........................... 562/621

FOREIGN PATENT DOCUMENTS 390074  11/1973  U.S.S.R. ............................. 562/621

*Primary Examiner*—Arthur C. Prescott
*Attorney, Agent, or Firm*—Frank M. Van Riet

[57] ABSTRACT

A method for the production of alkyl or alkaryl hydroxamic acids and/or salts wherein a $C_8$–$C_{22}$ alcohol is employed with water as the solvent is disclosed as well as the resultant salt and/or acid solutions per se and their use in the flotation of non-sulfide minerals, preferably clay.

6 Claims, No Drawings

COLLECTORS AND PROCESSES FOR MAKING AND USING SAME

This is a divisional of co-pending application Ser. No. 07/375,443, filed on Jul. 5, 1989 now U.S. Pat. No. 4,929,343 which, in turn, is a divisional of application Ser. No. 07/108,611, filed on Oct. 15, 1987 now U.S. Pat. No. 4,871,466.

BACKGROUND OF THE INVENTION

Alkyl or alkaryl hydroxamic acids and their salts are well-known collectors for the froth flotation of oxide minerals. Soviet workers have found a variety of applications for such alkyl hydroxamic acids. A recent review summarizes the flotation application of alkyl hydroxamic acids (Pradip and Fuerstenau, "Mineral Flotation with Hydroxamate Collectors", in "Reagents in the Minerals Industry", Ed. M. J. Jones and R. Oblatt, Inst Min. Met., London, 1984, pp. 161-168). Hydroxamic acids have been used for the flotation of metals or minerals such as pyrochlore (Nb, Ta), fluorite, huebnerite, wolframite, cassiterite, muscovite, phosphorite, hematite, pyrolusite, rhodonite, chrysocolla, malachite, barite, calcite, and rare-earths. They are generally more powerful and more selective than conventional fatty acids, fatty amines, petroleum sulfonates and alkyl sulfates. However, the commercially employed methods of making alkyl or alkaryl hydroxamic acid or its salts are tedious, and unsafe from the point of view of industrial production. For example, Organic Synthesis, Vol. II, page 67 sets forth a procedure for making potassium alkyl hydroxamate wherein a methanol solution of KOH (56 gm in 140 cc of methanol) and another of $NH_2OH \cdot HCl$ (41.7 gm in 240 cc of methanol) are combined. The KCl by-product is filtered off. To the filtrate is added 56.1 gm of a mixed liquid of methyl caprylate/caprate. After standing 24 hours, the product crystals (50 gm, or 67% yield) are filtered off. A major drawback of this method is the use of a large amount of methanol which is toxic and flammable. Another drawback is the use of potassium hydroxide which is more expensive than sodium hydroxide. Furthermore, the filtration of methanolic reaction mixture on an industrial scale is obviously not desirable in terms of safety. Finally, the yields are quite low.

Hartlage (U.S. Pat. No. 3,933,872, Jan. 20, 1976) claims an improved method of making fatty hydroxamates. Dimethylamine is used to effect the reaction between hydroxylamine sulfate and the methyl ester of a fatty acid in an anhydrous lower alcohol slurry. The free hydroxamic acids formed are neutralized with dimethylamine or an alkali metal base to yield, after filtering and drying, the ammonium or alkali metal salt precipitate. The procedure given, however, still employs flammable lower alcohols, i.e., methanol, ethanol or isopropanol. Furthermore, because of the heterogeneous nature of the reaction, the reaction rate is very slow, e.g., 15 hours in methanol and 5 days in isopropyl alcohol and filtration of the final hydroxamate product is still necessary. In an operation when methanol, a toxic flammable liquid, is employed, a hazardous environment is created. Finally reported yields are only in the 75-76% range.

Various Russian workers have reported methods for making alkyl hydroxamic acids and/or their salts in aqueous alkaline media. Sodium alkyl hydroxamates were made by reacting the methyl ester of a $C_{7-9}$ carboxylic acid with an aqueous solution of hydroxylamine sulfate and NaOH at a molar ratio of 1:1.22:2.2 and a temperature of 55° C. or below (Gorlovski, et. al. Vses. Soveshch. po Sintetich. Zhirozamenitelyam, Poverkhnostnoaktivn, Veschestvam i Moyushchim 66, 4983h, 1967). A yield of only 72-78% of the free $C_{7-9}$ hydroxamic acid was reported by Shchukina et. al. (Khim. Prom., Moscow, 1970, 49(3) 220) by reacting one mole of the methyl ester, 1.45 mole hydroxylamine sulfate, 7.39-7.82 moles NaOH for two hours at 20°-25° C. and one hour at 55°-60° C., followed by acidification to pH 4-5 at temperatures below 40° C. Again, in Sin. Primen. Novykh Poverkh. Veshchestv, 1973, 123-31 reported in C.A. 80, 1974, 95199k, Shchukina et al report a simple lab method for the production of a reagent designated as IM-50 from $C_{7-9}$ esters. In a Russian Patent (U.S.S.R. 390,074, Jul. 11, 1973 Chem. Abst. 79, 115162C (1973)) and also in an article (Zh. Prikl. Khim, (Leningrad) 1972 45(8), 1895-7, Chem. Abstract 78, 29193m 1973), Russian workers reported improved yields with the use of 3-5% of an anionic emulsifier in an alkaline aqueous medium. The authors reported that the use of an anionic surfactant such as sodium lauryl sulfate (3-5% based on the weight of the methyl ester), gave an improved yield of 61.2% for valerihydroxamic acid and 89% for caprihydroxamic acid. To obtain the yields claimed, however, a 40 molar % excess of hydroxylamine hydrochloride or sulfate was required. Furthermore, both the sodium slats and the free hydroxamic acids recovered are solids which are difficult to handle and process.

In another Russian patent (U.S.S.R. 513,970, May 15, 1976, Chem. Abst. 85, 66277g, 1976) a solution of mixed free $C_{8-11}$ hydroxamic acids was obtained in hydrocarbons. This was achieved by treating the sodium alkylhydroxmates with a mineral acid in the presence of 100-250 weight percent of a hydrocarbon containing less than 20% polar organic components (e.g., higher alcohols or esters). The aqueous layer containing NaCl or $Na_2SO_4$ was discarded as effluent.

Finally, U.S. Pat. No. 4629556 has recently issued wherein various colored impurities are removed from kaolin clays utilizing alkyl, aryl or alkylaryl hydroxamates as collectors. The hydroxamates are disclosed as having been produced by reacting free hydroxylamine with the methyl ester of an organic acid of appropriate hydrocarbon chain length and configuration in a non-aqueous medium such as methanol much in the same manner as taught in the above-mentioned articles.

While these reports certainly represent advancement of the art, there are still many drawbacks regarding industrial production. On a large scale of production, for example, the aqueous effluent can be substantial and can pose a serious problem for disposal. Furthermore, in order to obtain a product in liquid form, the alkali metal alkyl hydroxamates must be acidified to the free hydroxamic acids. This acidification is an additional step and causes a substantial increase in processing and handling time and costs. The use of anionic surfactants as taught by the Russians also causes a foaming problem during manufacture.

SUMMARY OF THE INVENTION

It has now been found that useful alkali metal alkyl hydroxamates can be produced by reacting the methyl or ethyl ester of a fatty acid having 6-22 carbon atoms with a hydroxylamine salt and an alkali metal hydroxide in the presence of a water/$C_8$-$C_{22}$ alcohol mixture, preferably in the presence of a non-ionic or cationic surfactant. This procedure results in the formation of a liquid solution of the hydroxamate which can be used as such in the froth flotation of non-sulfide minerals such as kaolin clays or neutralized to form a liquid alcohol solution of the acid which may also be so utilized The instant process of producing the alkali metal alkyl hydroxamate salts and acids eliminates the need for hazardous and expensive recovery steps such as filtration; it is relatively rapid, i.e., the reaction is complete in 3–5 hours; and it results in extremely high conversions, i.e., 85–95%, in the absence of foaming. When a surfactant is used, the instant process requires lesser amounts thereof than shown in the art.

Furthermore, when utilized in the froth flotation of non-sulfide minerals, the alcohol solutions of the hydroxamates and hydroxamic acids are significantly more effective than prior art compositions such as IM-50.

DESCRIPTION OF THE INVENTION INCLUDING PREFERRED EMBODIMENTS

As discussed briefly above, the instant invention resides in a method for the production of a salt of a fatty hydroxamic acid or the fatty hydroxamic acid per se by reacting a methyl or ethyl ester of a fatty acid having 6–22 carbon atoms, preferably at least 8 carbon atoms, with a hydroxylamine salt and an alkali metal hydroxide in the presence of water, a $C_8$–$C_{22}$ alcohol, preferably an alcohol of at least 10 carbon atoms. The reaction proceeds according to the equation:

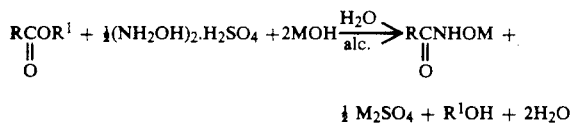

wherein R is a $C_6$–$C_{22}$ alkyl, an aryl ($C_6$–$C_{10}$) or an alkaryl ($C_7$–$C_{14}$) group, M is an alkali metal and $R^1$ is methyl or ethyl.

Useful acid esters include the methyl and ethyl esters of such carboxylic acids as caproic acid ($C_6$), enanthic acid ($C_7$), caprylic acid ($C_8$), pelargonic acid ($C_9$), caproic acid ($C_{10}$), undecanoic ($C_{11}$), lauric ($C_{12}$), tridecanoic ($C_{13}$), myristic ), pentadecanoic acid ($C_{15}$), palmitic acid ($C_{16}$), margaric acid ($C_{17}$), stearic acid ($C_{18}$) and the like. Oleic acid ($C_{18}$), benzoic acid, ethyl benzoic acid, salicylic acid, α-and β-naphthoic acid, cyclohexyl carboxylic acid, cyclopentyl carboxylic acid etc. are additional examples. Ethyl esters of above carboxylic acids require a higher reaction temperature than the methyl esters.

Hydroxylamine salts such as the sulfate or hydrochloride etc., can be used. Suitable alkali metal hydroxides include NaOH, KOH etc. Amines such as ammonia, dimethylamine etc. can be used in place of the hydroxides.

As mentioned above, a non-ionic or cationic surfactant is also preferably used. Exemplary surfactants include non-ionic surfactants such as alkyl polyethyleneoxy compounds represented by the formula:

wherein R is $C_8$–$C_{18}$ alkyl, EO is ethyleneoxy and n is a number from 1 to 10. Additional non-ionic surfactants include the reaction products of ethylene oxide and higher alkylene oxide with active hydrogen compounds such as phenols, alcohols, carboxylic acids and amines, e.g., alkylphenoxyethyleneoxy ethanols. Suitable cationic surfactants are those such as alkyl ammonium or quaternary ammonium salts, e.g., tetraalkyl ammonium chloride or bromide, dodecyl ammonium hydrochloride, dodecyl trimethyl quaternary ammonium chloride and the like, and ethoxylated fatty amines. Other suitable surfactants are described in McCutcheon's book of detergents and emulsifiers. Also included in the aforementioned surfactants are oligomeric and polymerizable surfactants described at pages 319-322 of Blackley, Emulsion Polymerization Theory and Practice, John Wiley and Sons (1975). Examples of such oligomers include ammonium and alkali metal salts of functionalized oligomers sold by Uniroyal Chemical under the trade name "Polywet" and copolymers of acrylonitrile and acrylic acid having molecular weights less than 2000 which are prepared in the presence of chain terminating agents such as n-octyl mercaptan. Examples of polymerizable surfactants include sodium salts of 9- and 10-(acrylylamido)stearic acid and the like. The effective amounts of the surfactant range from about 0.5 to 3%, by weight, of the alkyl ester, preferably about 1.0%–2.0%, by weight, same basis.

The higher alkyl alcohols are the $C_8$–$C_{22}$ alcohols, preferably $C_{10}$–$C_{18}$ alcohols. They can be linear or branched. Examples include octyl alcohol, nonyl alcohol, decyl alcohol, undecyl alcohol, dodecyl alcohol, tridecyl alcohol, tetradecyl alcohol, pentadecyl alcohol, hexadecyl alcohol, heptadecyl alcohol, stearic alcohol and the like. These alcohols may be used individually or as mixtures. The amount needed to effect a clear liquid varies according to the alcohol used, the hydroxamate to be made and the amount of water present. Based on quasi-elastic light scattering experiments, the clear liquids produced in the process of the invention were found, in reality, to be in a clear microemulsion form. Their stability is, therefore, a equilibrium balance between all of the components present. A generally useful guideline is 75–175 parts of alcohol per 100 parts of alkyl ester. For decyl alcohol, for example, the weight range can be 90 parts to 150 parts per hundred parts of the alkyl ester, preferably 115 to 138 parts. The concentration of the aqueous solution of hydroxylamine salt may vary from about about 15 to 35%, preferably from about 25–30%, by weight. The calculated amount of alkali used should be at least sufficient to both liberate the free hydroxylamine from its salts and to neutralize the free hydroxamic acid, although excess amounts (5–15%) may be used. The molar ratio of hydroxylamine salt to the ester should range from about 1:1 to 1.10:1.0. Excess amounts of hydroxylamine salt greater than 10% can be used but are not necessary and no beneficial result has been observed using such excess amounts.

The reaction temperature can range from about 15° to 55° C., preferably from about 25° to 35° C.

Sufficient water is used to dissolve the hydroxylamine salt. The amount of water used generally depends upon the concentration of the hydroxylamine salt solution. Water in the final hydroxamate salt product can vary from about 30–50%.

The instant invention is also directed to the novel compositions produced by the above-described process. These compositions comprise, if no neutralization of the product is conducted, a water/alcohol solution, the alcohol containing 8-22 carbon atoms, of the fatty hydroxamic acid salt, an alkali metal sulfate and preferably include a cationic or non-ionic surfactant. The solution will contain from about 10% to about 30% of the acid salt, from about 5% to about 10% of the sulfate, from about 0.0% to about 0.6% of the surfactant and water as indicated above. Minor or trace amounts of other ingredients which in no way modify or alter the final product may also be present.

When the above product is neutralized by the addition of acid whereby two phases are formed, the aqueous phase is removed such as by decantation or as described in U.S. Pat. No. 3933872, incorporated herein by reference. The organic phase results in the second novel composition of the present invention comprising a $C_8$-$C_{22}$ alcohol solution of the fatty hydroxamic acid and preferably the cationic or non-ionic surfactant. The acid content ranges from about 30% to about 70% and the surfactant ranges from about 0.0% to about 0.0%.

The above-described compositions are useful in the frother flotation of non-sulfide mineral ores such as those mentioned above and including copper ores, iron ores, rare and rare earth metal ores and, more particularly, in the beneficiation of clays.

Useful flotation methods are those well-known and established to those skilled in the art. In general, the methods comprise, firstly, the step of grinding of the ore to provide liberation of mineral values and ore particle size suitable for flotation. Secondly, the ground ore pulp is pH-adjusted, and conditioned with pre-selected and prescribed reagents such as collectors, frothers, modifiers, and dispersants. With some ores, the as-mined feed material is already finely divided and, therefore, no additional grinding is involved. Examples are glass sands, clays, tailings etc.

In the case of clays beneficiation for example, substantially no grinding of the as-mined feed is required since the average particle size is of the order of a few microns. The major impurities in kaolin clays are anatase ($TiO_2$) and complex iron minerals. These impurities impart color to the clay and decrease its brightness, thus making the clay unsuitable for many of its applications where purity and brightness are absolutely essential. Conventionally, the removal of such impurities is accomplished by a variety of methods, an important one being flotation using tall oil fatty acid.

In the froth flotation for beneficiating clay wherein the clay is slurried in an aqueous medium, conditioned with an effective amount of a dispersing agent and collector and floated, the instant invention comprises employing, as the collector, the novel compositions above, i.e., the hydroxamic acid/alcohol solution or the hydroxamic acid salt/water/alcohol solution in quantities ranging from about 0.1 to about 18.0 pounds per ton of ore, preferably 0.5-6 pounds per ton. The novel process of the present invention results in the recovery of clays in high yields, of low $TiO_2$ content and increased brightness.

As a first step in carrying out such a process, the clay to be purified is blunged in water at an appropriate solids concentration as described in U.S. Pat. No. 4629556, incorporated herein by reference. A relatively high pulp density, in the range of 35-70% solids, by weight, is preferred since the interparticle scrubbing action in such pulps helps liberate colored impurities from the surfaces of the clay particles.

Following conventional practice, a suitable dispersant, such as sodium silicate, polyacrylate, or polyphosphate, is added during blunging in an amount, e.g., 1-20 lb. per ton of dry solids, sufficient to produce a well-dispersed clay slip. An alkali, such as ammonium hydroxide, is also added as needed to produce a pH above 6 and preferably is the range of 8-10.5. The hydroxamate collector, in accordance with the invention, is then added to the dispersed clay under conditions, i.e., proper agitation speed, optimum pulp density, and adequate temperature, which permit reaction between the collector and the colored impurities of the clay in a relatively short time, generally not longer than 5-10 minutes.

When the clay has been conditioned after the addition of collector, it is transferred to a flotation cell and is usually diluted to a pulp density preferably in the range of about 15-45% solids, by weight. The operation of the froth flotation machine is conducted in conventional fashion. After an appropriate period of operation, during which the titaniferous impurities are removed with the foam, the clay suspension left in the flotation cell can be leached for the removal of residual iron oxides, filtered, and dried in conventional fashion.

The following examples are set forth for purposes of illustration only and are not to be construed as limitations on the present invention except as set forth in the appended claims. All parts and percentages are by weight unless otherwise specified.

EXAMPLE I

In a suitable three-neck reaction vessel, equipped with a condenser, a mechanically-driven stirrer and a thermometer, 180.8 parts of hydroxylamine sulfate are dissolved in 448 parts of water. 475 Parts of commercial decyl alcohol (contains 95% trimethyl-1-heptanols and 5% other homologous primary alcohols), 7.4 parts of a 50% dioctyl/decyl dimethyl ammonium chloride surfactant, and 337.2 parts of methyl caprylate/caprate are introduced. With stirring, the reaction mixture is cooled to 10°-15° C. with an ice/water bath. Sodium hydroxide (336 parts of 50% NaOH) is added slowly through an addition funnel. The temperature is kept at 15°-20° C. throughout the addition. After the caustic addition, the temperature is allowed to rise to 25° C. and the reaction is continued for 2-3 hours at 25°-30° C. The reaction is complete when the IR spectrum of the reaction mixture shows no trace of the ester band (1175 $cm^{-1}$). The clear liquid, by UV analysis (FeCl3 method), gives a hydroxamate content of 20.3% vs. theoretical 21.5%. This represents a 94.4% conversion of the ester into the sodium hydroxamate salt. The total weight of the liquid is 1,775 parts or a 99.5% recovery of the total charge and is composed of a capryl/capra hydroxamic acid sodium salt, sodium sulfate and dioctyl/decyl dimethylammonium chloride micro emulsion in decyl alcohol and water.

EXAMPLE II

The preparation of Example 1 is repeated with the exception of replacing the cationic surfactant with 4.0 parts of a non-ionic surfactant, an ethoxylated nonylphenol(EO=9.5). The emulsion product is a clear liquid having a 19.0% hydroxamate content or 87% conversion.

EXAMPLE III

Example I is again repeated except that no surfactant is used. The liquid product is slightly hazy and, on standing, about 5%, by volume, of an aqueous layer separates on the bottom. Assay gives an 87% conversion to the hydroxamate.

EXAMPLE IV

Example I is again repeated. To the final clear liquid are added 365 parts of 27% hydrochloric acid. Two solution phases form and are separated. The upper organic layer containing the free hydroxamic acid (892 parts) is found, by analysis, to contain 34% free hydroxamic acid vs. 38% theoretical or 89.5% conversion. It is a solution of the capryl/capra hydroxamic acid in decyl alcohol. The product is compatible with tall oil fatty acids.

EXAMPLES V-VII

Example I is again repeated except that the decyl alcohol is replaced with (V) isooctyl alcohol, (VI) dodecyl alcohol and (VII) a 1:1 mixture of iso-octyl and dodecyl alcohol. The conversions to the hydroxamates are all excellent (89–92%). The product of Example VII remains liquid on standing at room temperature while those of Example V and Example VI solidify. Addition of 10% water to (V) gives a clear liquid product. The product of Example VI (400 parts) is neutralized with 81 parts of a 30% sulfuric acid (pH 7.0), and the organic layer is separated from the aqueous layer (196 parts with 35% hydroxamic acid content or 90% conversion). The liquid product is again found to be compatible with tall oil fatty acid.

EXAMPLES VIII-IX

Replacement of the decyl alcohol of Example I, all else remaining equal, with (VIII) stearic alcohol or (IX) hexadecyl alcohol results in the production of substantially identically appearing compositions.

EXAMPLES X-XIII

The procedure of Example I is again followed except that the methyl caprylate/caprate is replaced by an equivalent amount of (X) methyl stearate; (XI) ethyl oleate; (XII) methyl palmitate or (XIII) methyl naphthoate. Similar results are achieved.

EXAMPLE XIV

386 Parts of fresh wet kaolin clay (equivalent to about 300 parts dry solids) are blunged at 65% solids for 5 minutes in a commercial blender with water, ammonium hydroxide (to give a final pH of 9.0–9.5), and 0.48 part of sodium silicate. A prescribed amount of collector of the present invention (or other collector for comparative purposes) is then added to the well dispersed clay slurry and conditioned in the blender for an additional 5 minutes. The conditioned pulp is then transferred to a 1.2 l flotation cell, diluted with water to about 25% solids, agitated at 1000 rpm and floated with carefully regulated air flow (in the range 0.1 to 1.5 l/min. of air) for up to 15 minutes.

The floated product containing mostly the anatase impurity and the unfloated, cell product containing the clean and bright clay values are filtered, dried and assayed for $TiO_2$ and Fe. The results are set forth in Table I, below:

TABLE I

Removal of Anatase Impurities from Kaolin Clays

| | | | Clay Product | | |
|---|---|---|---|---|---|
| Ex. # | Collector | Dosage Kg/t | % $TiO_2$ | Brightness | % Clay Yield |
| A | Tall oil fatty acid* | 2 | 0.6 | 85.9 | 49*** |
| B | $C_8$ carboxylic acid* | 2 | 1.22 | 83.4 | 65*** |
| C | $C_{12}$ carboxylic acid | 2 | 1.01 | 84.5 | 80 |
| D | Mixture of $C_1$ & $C_{18}$ carboxylic acids* | (1.5 + 0.5)** | 0.70 | 85.5 | 70 |
| $E^x$ | $C_8$–$C_{10}$ hydroxamate (Methanol Method) | 1 | 0.22 | 87.1 | 78 |
| $F^y$ | $C_8$–$C_{10}$ hydroxamate (Methanol Method) | 1 | 0.25 | 88.8 | 86 |
| $G^z$ | Sodium octyl hydroxamates (Soviet Teachings) | 1 | 0.21 | 88.0 | 68 |
| $H^z$ | C8-C10 hydroxamate (Soviet Teachings) | 1 | 0.25 | 86.5 | 83 |
| | | 0.7 | 0.71 | — | 76 |
| | | 0.9 | 0.31 | — | 77 |
| J | $H^z$ + Tall oil fatty acid | (10.5 + 1.5)** | 0.20 | 88.8 | 44 |
| K | $H^z$ + decyl alcohol | (1.2 + 1.0) | 0.17 | 87.7 | 62 |
| | $H^z$ + decyl alcohol | (0.47 + 0.39) | 0.37 | 89.3 | 86 |
| | $H^z$ + decyl alcohol | (0.7 + 0.58) | 0.19 | 90.0 | 74 |
| XV | $C_8$–$C_{10}$ hydroxamates of Example I | (0.35 + 0.40)** | 0.34 | 85.0 | 87 |
| XVI | $C_8$–$C_{10}$ hydroxamates of Example I | (0.48 + 0.54) | 0.28 | 85.5 | 90 |
| XVII | $C_8$–$C_{10}$ hydroxamates of Example I | (0.55 + 0.63) | 0.24 | 85.9 | 86 |
| XVIII | $C_8$–$C_{10}$ hydroxamates of Example I | (0.66 + 0.75) | 0.30 | 89.0 | 90 |
| XIX | $C_8$–$C_{10}$ hydroxamates of Example I | (0.88 + 0.10) | 0.29 | 89.5 | 90 |

*0.77 kg/t of $CaCl_2.2H_2O$ was added as an activator for fatty acid flotation of anatase.
**First figure represents hydroxamate dosage; 2nd figure represents decyl alcohol dosage.
***Foaming occurs
x & y = products are solid
z = anionic emulsifier used.

The results in Table I demonstrate the superiority of the novel collectors of the present invention (Examples XV-XIV) over the fatty acids used commercially (Examples A-D); $C_{8-10}$ hydroxamates of the teachings of the Soviet workers (Examples G and H), and $C_{8-10}$ hydroxamates prepared in methanol as in U.S. Pat. No. 4,629,556 (Examples E and F). With the use of the novel collector of Example I, the yield of clay is the highest (in the range 86-90%), and the $TiO_2$ impurity in the clay product is low and acceptable (below 0.35%). The brightness of the clay product is also quite high (85-89.5). It can be readily seen from these results that with the other collectors all three requirements-viz. high yield of clay, low $TiO_2$, and high brightness-are not simultaneously satisfied at comparable dosages. In Example F, the metallurgical requirements are satisfied to some extent (although yield is only 86%), but the dosage of hydroxamate used (1 kg/T) is too high compared with the hydroxamate dosage of 0.35-0.88 kg/t for the novel collectors of Examples XV-XIX. A hydroxamate dosage equivalent of about 0.5-0.6 kg/t is shown to be sufficient for the novel collector of the present invention.

The use of decyl alcohol in conjunction with the $C_{8-10}$ hydroxamates prepared according to the Soviet teachings improves the metallurgy to a slight degree (compare Example H with example K), but again all three metallurgical requirements are not concurrently satisfied at comparable dosages thereby indicating that the hydroxamate prepared by following the Soviet teachings is inferior.

EXAMPLES XX-XXIV

Following the procedure of Example XIV except that an aged clay is employed, the following results are obtained.

| Example | Dosage lb/T real* | % Clay Yield | % $TiO_2$ in Clay | Brightness |
|---|---|---|---|---|
| XX | 0.58 | 82.6 | 0.41 | 86.3 |
| XXI | 0.77 | 77.3 | 0.29 | 87.2 |
| XXII | 0.96 | 75.7 | 0.28 | 87.5 |
| XXIII | 1.15 | 75.0 | 0.28 | 87.6 |
| XXIV | 1.25 | 71.4 | 0.29 | 87.7 |

*real dosage of hydroxamate equivalent

EXAMPLES XXV-XXVII

The procedure of Examples XX-XXIV is again followed except that the composition of Example IV is used and different alcohols are employed in the hydroxamate production. The results achieved follow:

| Example | Dosage lb/T real* | % Clay Yield | % $TiO_2$ in Clay | Brightness |
|---|---|---|---|---|
| XXV | 1.25 (isooctanol) | 62.9 | 0.23 | 87.9 |
| XXVI | 1.25 (Decanol) | 79.2 | 0.29 | 87.4 |
| XXVII | 1.25 (Dodecanol) | 84.7 | 0.29 | 87.7 |

EXAMPLES XXVIII-XXXII (Comparative)

Again following the procedure of Examples XX-XXVI except that a commercially available hydroxamate collector (IM-50) is used, the following results are observed.

| Example | Dosage lb/T real* | % Clay Yield | % $TiO_2$ in Clay | Brightness |
|---|---|---|---|---|
| XXVIII | 0.50 | 79.2 | 0.99 | 84.3 |
| XXIX | 0.75 | 72.1 | 0.75 | 85.1 |
| XXX | 1.00 | 76.2 | 0.57 | 86.0 |
| XXXI | 1.25 | 72.6 | 0.42 | 85.8 |
| XXXII | 1.50 | 71.1 | 0.37 | 87.0 |

EXAMPLES XXXIII-XXXVIII

When the procedure of Example XIV is again followed except that the collectors of (XXXIII) Example VIII; (XXXIV) Examples IX; (XXXV) Example X; (XXXVI) Example XI; (XXXVII) Example XII and (XXXVIII) Example XIII are used, similar results are achieved.

We claim:

1. A method for the production of a salt of a fatty hydroxamic acid which comprises admixing a methyl or ethyl ester of a fatty acid having 6-22 carbon atoms with a hydroxylamine salt, an alkali metal hydroxide, water, a $C_8$-$C_{22}$ alcohol and a cationic or non-ionic surfactant to form an emulsion comprising an aqueous phase and an organic phase and allowing the hydroxylamine salt and the ester of the fatty acid to react whereby a clear microemulsion forms comprising an alkali metal salt of the fatty hydroxamic acid, a sodium salt and the surfactant in the alcohol and water.

2. A method according to claim 1 wherein said alcohol is decyl alcohol.

3. A method according to claim 1 wherein said hydroxylamine salt is hydroxylamine sulfate.

4. A method according to claim 1 wherein said ester of a fatty acid is methyl caprylate.

5. A method according to claim 1 wherein said alcohol is dodecyl alcohol.

6. A method according to claim 1 wherein the resultant salt of the fatty hydroxamic acid is neutralized with acid to thereby form an organic phase and an aqueous phase and the organic phase is recovered.

* * * * *